US008345303B2

(12) United States Patent
Yoshimoto (10) Patent No.: US 8,345,303 B2
(45) Date of Patent: Jan. 1, 2013

(54) IMAGE PROCESSING APPARATUS

(75) Inventor: Kazuhiro Yoshimoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 657 days.

(21) Appl. No.: 12/618,334

(22) Filed: Nov. 13, 2009

(65) Prior Publication Data

US 2010/0123929 A1 May 20, 2010

(30) Foreign Application Priority Data

Nov. 14, 2008 (JP) ................................. 2008-291968

(51) Int. Cl.
*G06K 15/00* (2006.01)
*G06F 3/12* (2006.01)

(52) U.S. Cl. ......................... 358/1.18; 358/1.2; 358/1.15

(58) Field of Classification Search ......................... None
See application file for complete search history.

(56) References Cited

U.S. PATENT DOCUMENTS

| 5,757,467 | A | 5/1998 | Katakura et al. | |
|---|---|---|---|---|
| 6,453,078 | B2 * | 9/2002 | Bubie et al. | 382/305 |
| 2004/0252318 | A1 * | 12/2004 | Kuroda et al. | 358/1.12 |
| 2005/0002555 | A1 | 1/2005 | Kumiya et al. | |
| 2007/0157084 | A1 * | 7/2007 | Yano et al. | 715/527 |
| 2008/0252917 | A1 * | 10/2008 | Kuroda et al. | 358/1.13 |
| 2009/0091772 | A1 * | 4/2009 | Ujiie et al. | 358/1.9 |

FOREIGN PATENT DOCUMENTS

| CN | 1550297 A | 12/2004 |
|---|---|---|
| JP | 2005-51279 A | 2/2005 |
| JP | 2006-25006 A | 1/2006 |
| JP | 2006-287744 A | 10/2006 |

* cited by examiner

*Primary Examiner* — Don Popovici
(74) *Attorney, Agent, or Firm* — Birch, Stewart, Kolasch & Birch, LLP

(57) ABSTRACT

An image processing apparatus has a function of printing pieces of image data to be printed arranging them on one printing paper sheet. In a preview display screen of the image processing apparatus, when a specific piece of image data is selected by a user's operation from a plural piece of image data, the specific piece of image data is displayed being distinguished. Pieces of image data in the same shooting orientation as that of the specific piece of image data are searched for and their display is similarly varied. At this time, when rotation of the images is selected using a dialogue, the orientation of the pieces of image data is rotated at once by 180°. Thereby, the orientations of pieces of image data shot in a portrait-like posture may easily be adjusted to be the same and their images may be printed according to the preview display.

7 Claims, 9 Drawing Sheets

IMAGE PROCESSING APPARATUS

CROSS-NOTING PARAGRAPH

This non-provisional application claims priority under 35 U.S.C. §119(a) on Patent Application No. 2008-291968 filed in JAPAN on Nov. 14, 2008, the entire contents of which are hereby incorporated herein by reference.

FIELD OF THE INVENTION

The present invention relates generally to an image processing apparatus, and more particularly, to an image processing apparatus that has a printing function and a function of preview-displaying image data before printing.

BACKGROUND OF THE INVENTION

An image processing apparatus that enables digital image data transferred from a digital camera, etc., to be printed is present. For example, a multi-function peripheral having a scanner function and a printer function is used as the image processing apparatus, and the image processing apparatus is installed in a convenience store, etc., and provides a printing service of image data shot by a digital camera.

Such a multi-function peripheral has a function of printing a plural piece of image data arranging them on a printing paper sheet when the multi-function peripheral prints the pieces of digital image data. When the multi-function peripheral executes this function, the multi-function peripheral usually executes preview-displaying for the printing on a display panel of the multi-function peripheral before executing the printing of the image data.

In the case where a user transfers digital image data shot using a digital camera to a multi-function peripheral and causes the multi-function peripheral to print the data, when users shoot using the digital camera in, for example, a portrait-like posture, pieces of image data that are rotated clockwise by 90° and pieces of image data that are rotated counterclockwise by 90° may be present being mixed. This is because the upward direction of each piece of image data differs by user when each of the users sets the digital camera in the portrait-like posture.

When these pieces of image data are printed as they are, printed images of the data include printed images in one orientation and printed images in another orientation that differs by 180° from the orientation being mixed and, therefore, viewing the printed images becomes troublesome. Therefore, a multi-function peripheral may rotate each piece of image data by 180°. When a piece of image data is rotated, a user needs to select the piece of image data that the user desires to rotate and execute an Operation to individually rotate the selected piece of image data in the preview display of the multi-function peripheral.

For example, Japanese Laid-Open Patent Publication No. 2006-287744 discloses an apparatus that obtains image rotational information created during shooting by a camera and automatically rotates the image based on the image rotational information as a technique to adjust the orientation of a piece of image data as above.

As above, in the case where an image processing apparatus such as a multi-function peripheral prints a plural piece of digital image data arranging them on one printing paper sheet, when the pieces of image data include vertically long image and horizontally long image being mixed, a user needs to manually select all the pieces of image data that the user desires to rotate in the preview display and press down a rotation button for each of these pieces of image data and, therefore, a problem has arisen that the procedure is complicated and convenience and usefulness are insufficient.

According to the technique described in the above '744 publication, during the shooting by the camera, the orientation of each piece of image data is varied depending on whether the piece of image data is shot in the portrait-like posture by holding the camera with its left side upward or the piece of image data is shot in the portrait-like posture by holding the camera with its right side upward. Therefore, even when the image processing apparatus rotates each piece of image data using the image rotational information obtained when the piece of image data is shot, all pieces of image data may not be always in the same orientation.

SUMMARY OF THE INVENTION

The object of the present invention is to provide an image processing apparatus that has a function of arranging and printing a plural piece of image data obtained by the apparatus, wherein the image processing apparatus is adapted to be capable of printing the pieces of image data securely arranging them in the same orientation by a simple operation.

Another object of the present invention is to provide an image processing apparatus comprising: an image data obtaining portion that obtains image data from an external storage medium; a printer portion that prints on a recording medium the image data obtained by the image data obtaining portion; a displaying portion that preview-displays the image data to be printed by the printer portion before printing; a display control portion that causes the displaying portion to preview-display side-by-side a plurality of pieces of image data obtained by the image data obtaining portion; a shooting rotational information detecting portion that detects shooting rotational information added to the image data of which preview is displayed when the image data was shot; and an operation input portion that accepts operation input by a user, and configured to print the image data with the printer portion according to the preview-displaying, and wherein the display control portion selects a specific piece of image data in reception to the reception of the operation input through the screen of the displaying portion preview-displaying, and rotates at once all of pieces of image data having the shooting rotational information same as or opposite to the shooting rotational information added to the specific piece of image data according to the detection result by the shooting rotational information detecting portion.

Another object of the present invention is to provide the image processing apparatus, wherein after the specific piece of the image data is selected and before an instruction for rotating image data is input to the operation input portion, the display control portion causes the display portion to change the preview-displaying manner to preview-display the specific piece of image data and pieces of the image data having the rotational information same as that added to the specific piece of image data so that they may be distinguished from the other and regarded as rotatable image data, and then if an instruction for rotating the rotatable image data is input to the operation input portion, the display control portion causes the display portion to rotate at once with the specific pieces of the image data all of the piece of image data having the rotational information same as that added to the specific piece of image data.

Another object of the present invention is to provide the image processing apparatus, wherein after the specific piece of the image data is selected, the display control portion, causes the display portion to change the preview-displaying manner to preview-display the specific piece of image data and pieces of the image data having the rotational information same as that added to the specific piece of image data so that they may be distinguished from the other and regarded as rotatable image data, and then if an instruction for rotating the rotatable image data is input to the operation input portion, the display control portion causes the display portion to rotate at once with the specific pieces of the image data all of the piece of image data having the rotational information same as that added to the specific piece of image data.

Another object of the present invention is to provide the image processing apparatus, wherein after the specific piece of the image data is selected, the display control portion, causes the display portion to change the preview-displaying manner to preview-display the image data having the rotational information opposite to the specific piece of image data so that they may be distinguished from the other and regarded as rotatable image data, and then if an instruction for rotating the rotatable image data is input to the operation input portion, the display control portion causes the display portion to rotate at once with the specific pieces of the image data all of the piece of image data having the rotational information opposite to that added to the specific piece of image data.

Another object of the present invention is to provide the image processing apparatus as defined, wherein the display control portion causes the displaying portion to display a dialogue to prompt the user to input the instruction for rotating the image data.

Another object of the present invention is to provide the image processing apparatus as defined, wherein the display control portion creates reduced-size image data from the image data obtained by the image data obtaining portion, and causes the displaying portion to preview-display the reduced-size image data.

Another object of the present invention is to provide the image processing apparatus as defined, wherein the display control portion causes the displaying portion to display the plurality of previews side by side on the screen of the displaying portion so that all of the image on a page are vertically long or horizontally long, and the printer portion prints the page on which all of the image are vertically long or horizontally long.

PREFERRED EMBODIMENTS OF THE INVENTION

Figure 1:
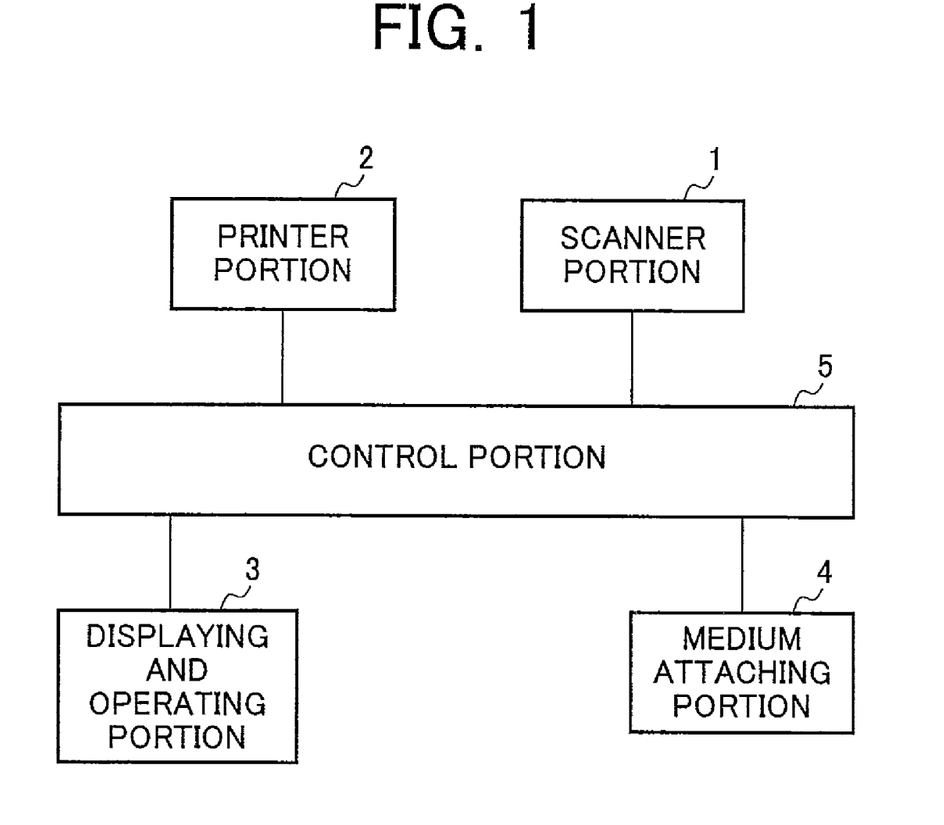
FIG. 1 is a block diagram of an exemplary configuration of an image processing apparatus according to the present invention.

FIG. 1 is a block diagram of an exemplary configuration of an image processing apparatus according to the present invention and depicts the main configuration of the image processing apparatus configured as a multi-function peripheral.

The image processing apparatus includes a scanner portion 1 that reads an image of a draft set on a draft table and that creates image data of the draft, a printer portion that image-forms (prints) on a printing paper sheet (recording medium) an image based on the image data, a displaying and operating portion 3 that enables displaying of a screen and operation-inputting of an input by a user, a medium attaching portion 4 that is attached with a storage medium and that reads data therefrom, and a control portion 5 that controls these portions.

The scanner portion 1 includes a scanner unit, the draft table made of transparent glass, a reversible automatic draft feeder (RADF), etc., that are not depicted. The RADF conveys drafts set on a predetermined draft tray one by one to the draft table and brings out the draft after the reading to an ejecting tray. The RADF may also turn over each of the drafts after the reading and convey the draft again to the draft table. Thereby, the scanner portion 1 is adapted to be capable of reading an image present on each of both sides of a draft. The scanner unit included in the scanner portion 1 reads a draft image on the draft table one line by one line, and includes a scanning unit, an optical lens, a CCD line sensor, etc. The scanning unit directs and focuses a light beam from a light source and a reflected light beam from a draft respectively to/on the optical lens and the CCD line sensor and, thereby, the CCD line sensor is caused to output an electric signal. Image data of the draft is obtained by converting this electric signal into the image data.

The printer portion 2 includes a laser beam writing unit (LSU), an electronic photograph processing portion, a paper sheet conveying mechanism, etc., that are not depicted. The LSU forms an electrostatic latent image by applying a laser beam to a photosensitive drum included in the electronic photograph processing portion based on image data obtained from the scanner portion 1, a host PC, a portable storage medium, etc. The LSU includes a semiconductor laser light source to apply a laser beam, a polygon mirror to deviate the laser beam at an equi-angular velocity, an f-θ lens that corrects the laser beam deviated at the equi-angular velocity to be deviated on the photo-sensitive drum at an equi-angular velocity, etc.

The displaying and operating portion 3 includes a displaying panel that displays a screen for various kinds of information and inputting operations to operate the image processing apparatus, and a touch panel to execute inputting operations in response to information displayed on the displaying panel. The displaying and operating portion 3 may be caused to execute preview-displaying when the printer portion 2 prints digital image data obtained from the storage medium, etc. In addition to the above touch panel, a group of hard keys, etc., included in the image processing apparatus may be used as a means for a user to execute input operations. An operation input portion and a displaying portion of the present invention are realized by the displaying and operating portion 3.

The medium attaching portion 4 may be attached with a storage medium that has recorded thereon digital image data to be printed. The form of the storage medium is not specifically limited and the portion 4 may be adapted to be attached with, for example, various types of memory card. Otherwise, the portion 4 may be attached with a USB memory or the portion 4 may be a drive to be attached with a disc-type storage medium. When the storage medium is a disc-type storage medium, various storage media may be applied such as, for example, a CD-ROM, a CD-R, and a DVD-ROM. The medium attaching portion 4 may also support a DVD-RAM, a BD (Blu-ray Disc), etc.

The medium attaching portion 4 reads image data retained in a storage medium attached thereto, transfers the image data read to the control portion 5, and, thereby, may cause the printer portion 2 to print the image data read. Image data obtained by the image processing apparatus may also be obtained from a storage medium of an external apparatus using a communication I/F not depicted.

The control portion 5 includes a computing means such as a CPU and a storing means such as a ROM or a RAM, and controls the portions (the means) of the image processing apparatus. In this case, the computing means such as a CPU executes a control program stored in the storing means such as a ROM or a RAM and, thereby, causes various processes to be executed.

The image processing apparatus of the present invention includes an image data obtaining portion that obtains image data from a storage medium. In an embodiment of FIG. 1, the image data obtaining portion is realized by the medium attaching portion 4 that reads image data from the storage medium and the control portion 5 that controls the medium attaching portion 4. The image data obtaining portion may be configured to obtain image data from the exterior through the communication I/F and, in this case, the image data obtaining portion is realized by the communication I/F and the control portion 5.

The control portion 5 realizes functions of a display control portion of the present invention that executes control to cause a displaying portion to preview-display image data obtained from a storage medium, etc., and a shooting rotational information detecting portion that detects shooting rotational information added to the image data obtained.

Figure 2:
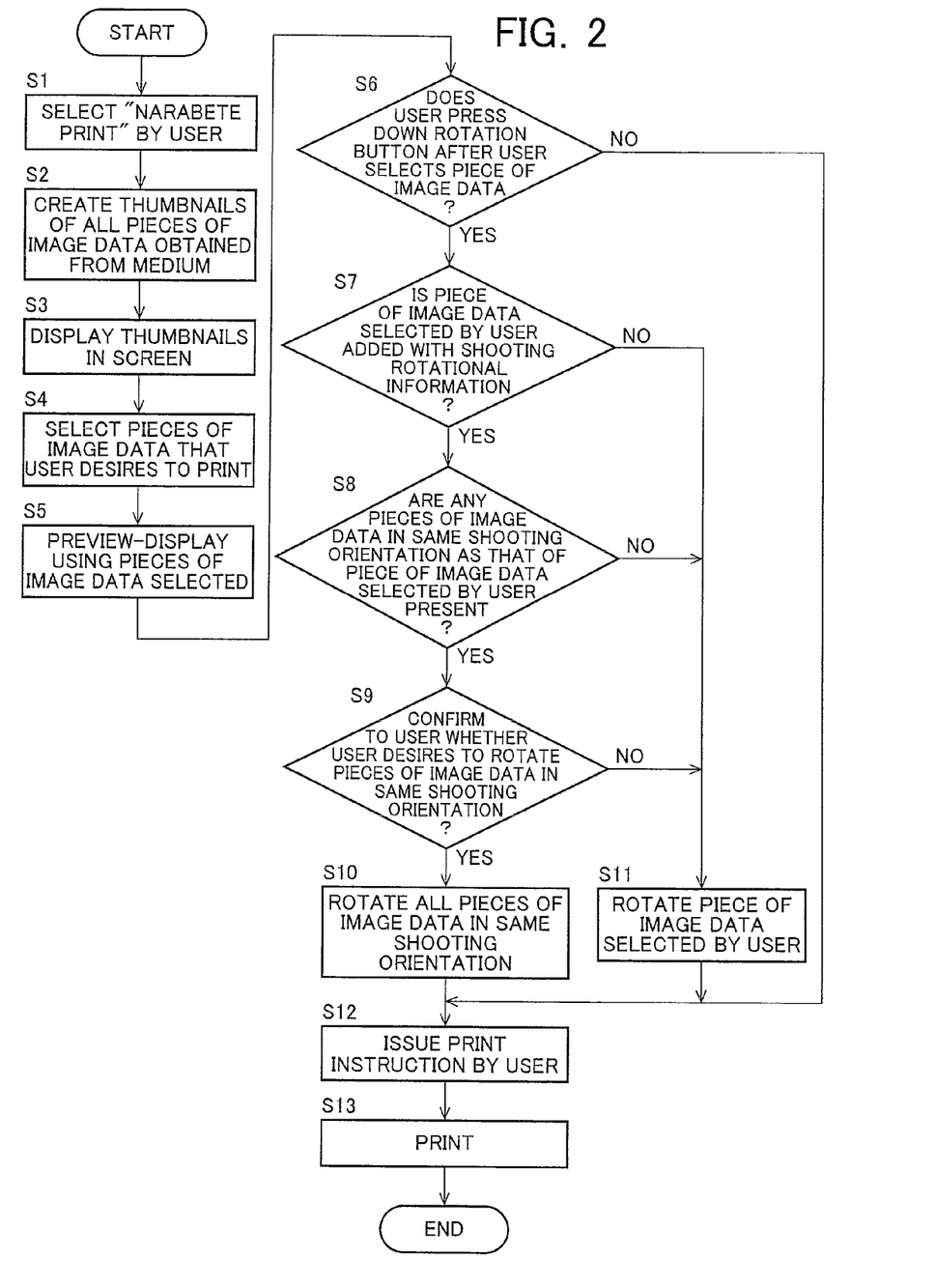
FIG. 2 is an explanatory flowchart of an exemplary process in the image processing apparatus according to the present invention.

FIG. 2 is an explanatory flowchart of an exemplary process in the image processing apparatus according to the present invention. In this case, the image processing apparatus has a function of printing a plural piece of image data obtained from a storage medium, etc., arranging these pieces of image data on one printing paper sheet (recording medium). This function is named, for example, "Narabete Print (Arranged Printing)" and a user may cause the image processing apparatus to execute a process according to the embodiment by selecting this "Narabete Print" in a display screen on the displaying and operating portion 3.

In FIG. 2, when the user selects "Narabete Print" in the display screen on the displaying and operating portion 3 (step S1), the image processing apparatus creates thumbnails (reduced-size image data) of all the pieces of image data using the pieces of image data obtained from the medium (step S2). The image processing apparatus displays the thumbnails in the screen on the displaying and operating portion 3 (step S3). At this time, the user selects the pieces of image data that the user desires to print from the thumbnails displayed (step S4). The image processing apparatus executes preview display using the pieces of image data that the user selects (step S5).

At this step, the preview display is executed according to the printing form of disposing the pieces of image data selected by the user from the thumbnails arranging them on one printing sheet.

Figure 3:
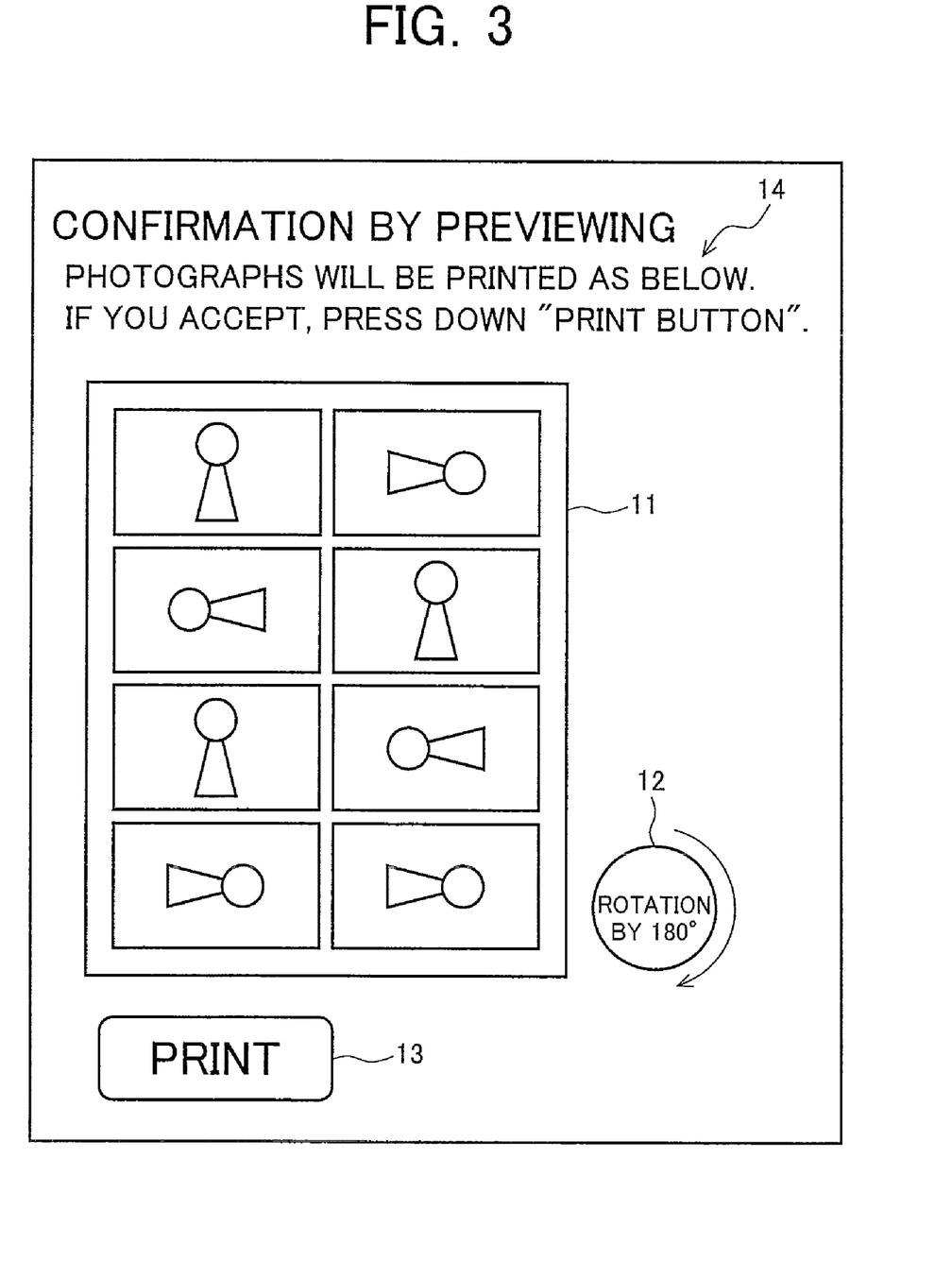
FIG. 3 is a diagram of an example of a preview screen of images selected.

FIG. 3 is a diagram of an example of a preview screen of the pieces of image data selected. The preview display screen of FIG. 3 displays an image displaying portion 11 that displays the plural pieces of image data selected by the user, a rotation button 12 to rotate the pieces of image data, and a print button 13 to instruct execution of printing. The preview display screen displays a dialogue 14 that is "Confirmation by previewing. The pieces of image data will be printed as this. If you accept it, press down [Print Button]." as in FIG. 3.

When the user accepts the preview-displayed pieces of image data as they are, the user issues a printing instruction by pressing down the print button 13 depicted in FIG. 3. In the flowchart of FIG. 2, a printing instruction by the user is issued without pressing down the rotation button 12 (step S6-NO) after the user selects the pieces of image data (step S12) and, according thereto, the image processing apparatus prints the pieces of image data selected (step S13) and the process comes to an end.

On the other hand, as depicted in FIG. 3, when the pieces of image data displayed as the thumbnails include those that are rotated clockwise and those that are rotated counterclockwise being mixed, some users desire to cause the directions of the rotations of printed images to be same. In this case, each of such users selects one piece of image data in the preview display screen and presses down the rotation button 12 (step S6-YES).

Figure 4:
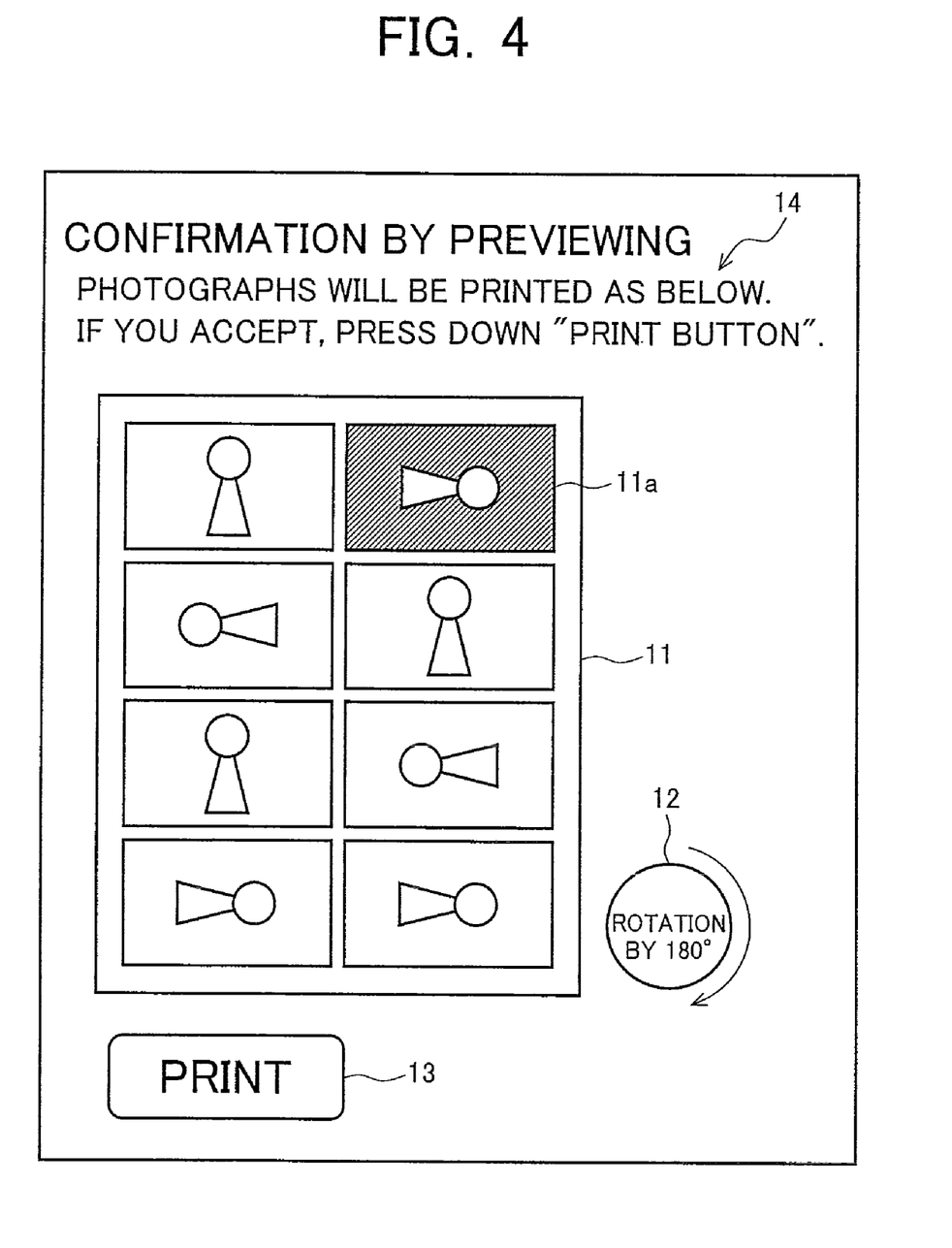
FIG. 4 is a diagram of exemplary display displayed when a user selects one image from previewed images.

FIG. 4 is a diagram of exemplary display displayed when a user selects one piece of image data from the previewed images. In the example depicted in FIG. 4, it is assumed that the user selects an image 11a in upper right from the pieces of image data displayed in the image displaying portion 11 in the preview display screen. When the piece of image data is selected, the image processing apparatus explicitly displays that the selected piece of image data is in a selected state by distinguishing the selected piece of image data from the other pieces of image data. This explicit display is executed by, for example, reducing the brightness of the selected piece of image data. However, a frame may be displayed surrounding the selected piece of image data or the color tone of the selected piece of image data may be changed as the explicit display and the method of the explicit display is not limited.

In the flowchart of FIG. 2, when the user selects the piece of image data and presses down the rotation button in the preview display screen (step S6-YES), the image processing apparatus determines whether any shooting rotational information is added to the piece of image data selected by the user (step S7). The shooting rotational information is added to image data by an image sensing apparatus such as a digital camera when shooting is executed by the image sensing apparatus. Any one of information indicating that the upper side of a camera is upside "TT", information indicating that the left side of the camera is upside "LT", and information indicating that the right side of a camera is upside "RT" as specific examples of the shooting rotational information is added to image data. The orientation of image data denoted by LT and that of image data denoted by RT are opposite to each other.

When no shooting rotational information is added to the piece of image data selected by the user, the image processing apparatus rotates only the piece of image data selected by the user (step S11). On the other hand, the shooting rotational information is added to the piece of image data selected, the image processing apparatus searches to check whether any pieces of image data in the same shooting orientation as that of the piece of image data selected by the user are present in the other pieces of image data displayed in the preview screen (step S8). At this step, when no piece of image data in the same shooting orientation as that of the piece of image data selected is present, the image processing apparatus rotates only the piece of image data selected by the user (step S11). On the other hand, when pieces of image data in the same shooting orientation are present, the image processing apparatus explicitly displays the pieces of image data in the same shooting orientation distinguishing them from other pieces of image data similarly to the piece of image data selected, and confirms to the user whether the user desires to rotate these pieces of image data (step S9).

Figure 5:
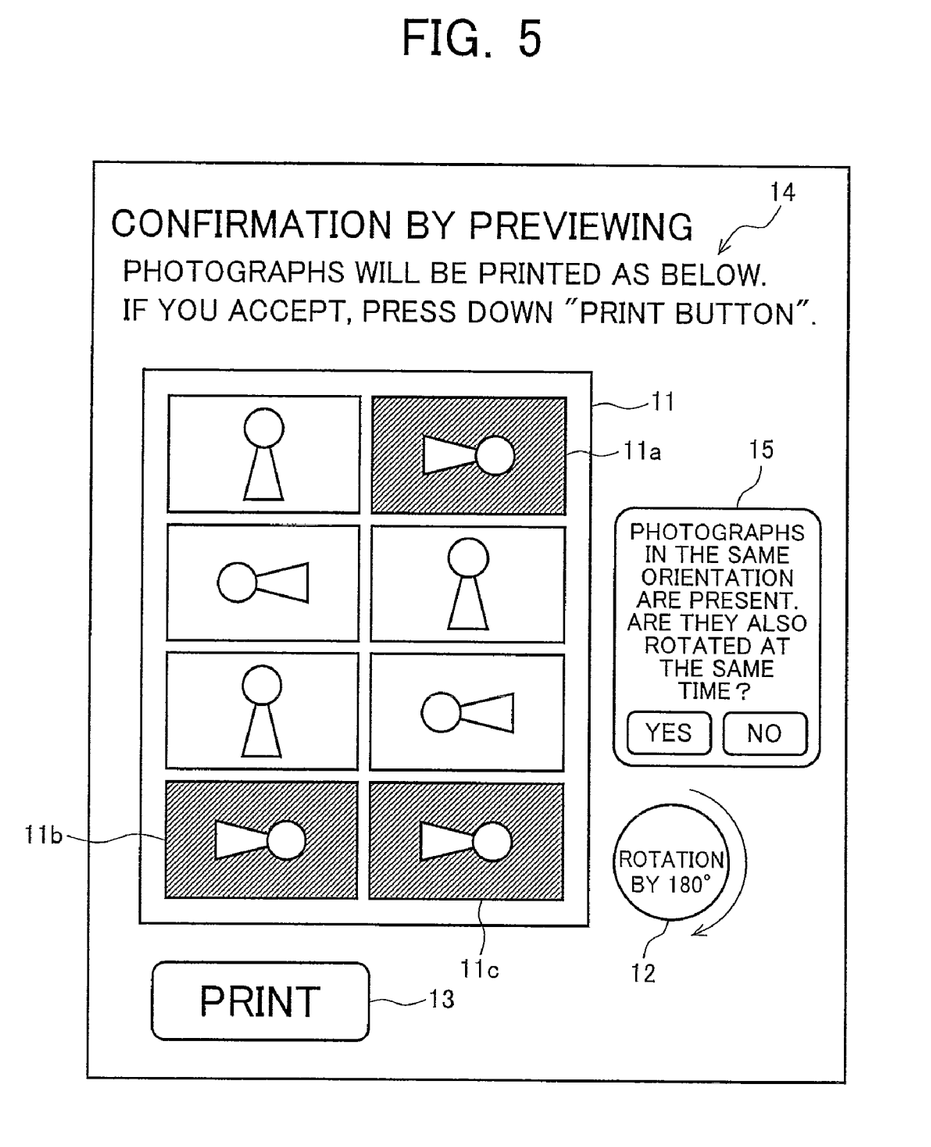
FIG. 5 is a diagram of an example of a preview display screen displayed when images in the same shooting orientation as that of the images selected by the user are rotated.

FIG. 5 is a diagram of an example of a preview display screen displayed when the pieces of image data in the same shooting orientation as that of the piece of image data selected by the user are rotated. The image processing apparatus explicitly displays pieces of image data 11b and 11c having the same shooting rotational information as that of a piece of image data 11a selected by the user distinguishing the pieces of image data 11b and 11c from the other pieces of image data by, for example, reducing their brightness similarly to the piece of image data 11a in the image displaying portion 11 in the preview display screen. At this time, the image processing apparatus causes a dialogue 15 "Photographs in the same orientation are present. Are they also rotated at the same time?" to be displayed and, thereby, enables a selection operation of acceptance or refusal of rotation of the pieces of image data. The display of this dialogue corresponds to step S9 of the flowchart of FIG. 2.

When the user executes an operation to instruct not to rotate the other pieces of image data in the same shooting orientation (step S9-NO), the image processing apparatus rotates only the piece of image data selected by the user (step S11). On the other hand, when the user executes an operation to instruct to rotate the other pieces of image data in the same shooting orientation (step S9-YES), the image processing apparatus rotates at once all of the piece of image data selected by the user and the pieces of image data in the same shooting orientation as that of the piece of image data selected by the user (step S10).

Figure 6:
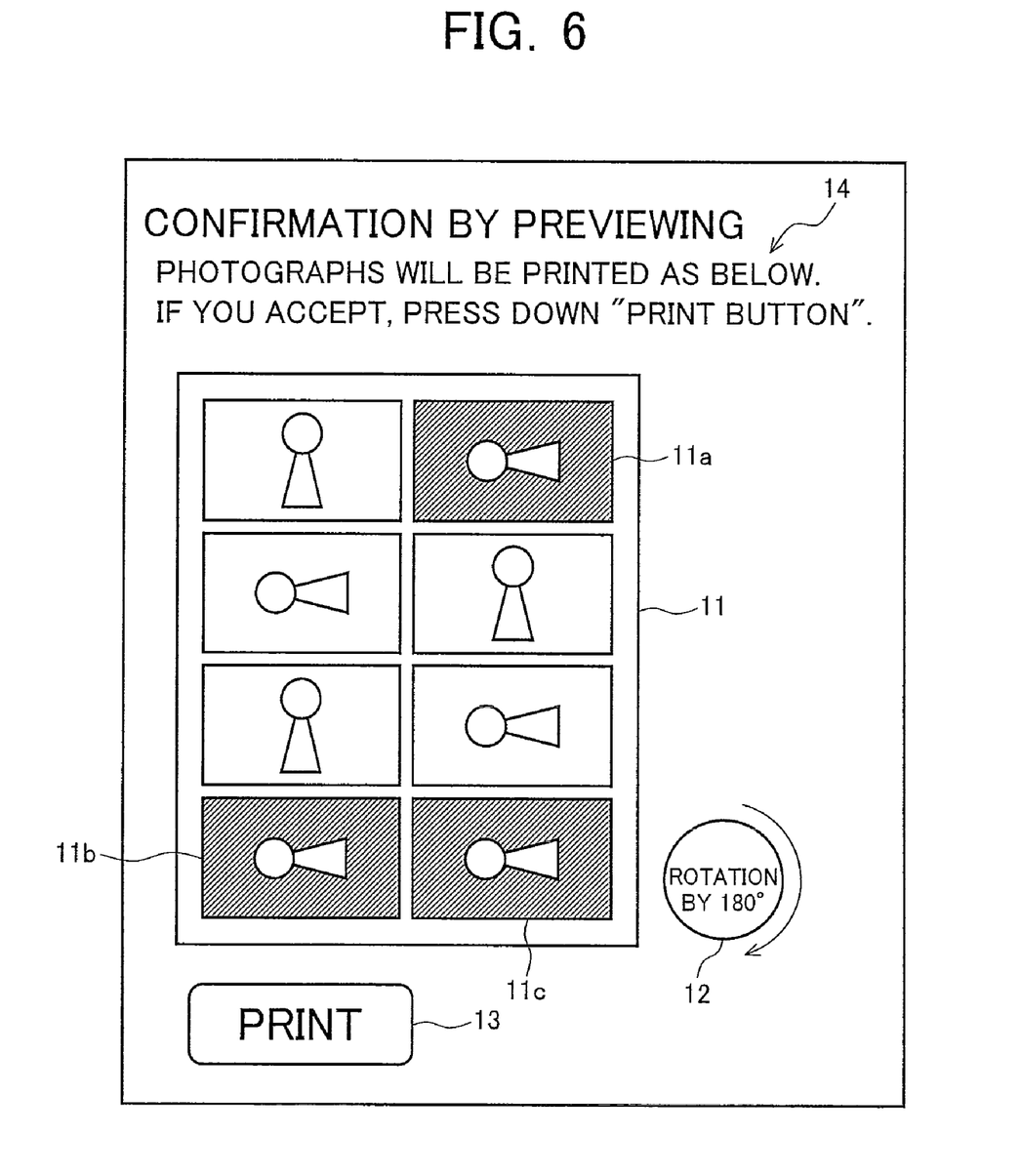
FIG. 6 is a diagram of an example of a preview display screen displayed after the image in the same shooting orientation as that of the image selected by the user is rotated.

FIG. 6 is a diagram of an example of a preview display screen displayed after the pieces of image data in the same shooting orientation as that of the image selected by the user are rotated. As depicted in FIG. 6, when the user executes the operation to rotate at once all the pieces of image data in the same shooting orientation as that of the piece of image data selected, the pieces of image data 11b and 11c in the same shooting orientation as that of the piece of image data 11a selected are all rotated by 180° together with the piece of image data 11a selected and all of these pieces of image data are preview-displayed.

By pressing down of the print button 13 by the user in this state, a printing instruction is issued to the image processing apparatus and printing according to the preview display image is executed (step S13).

Figure 7:
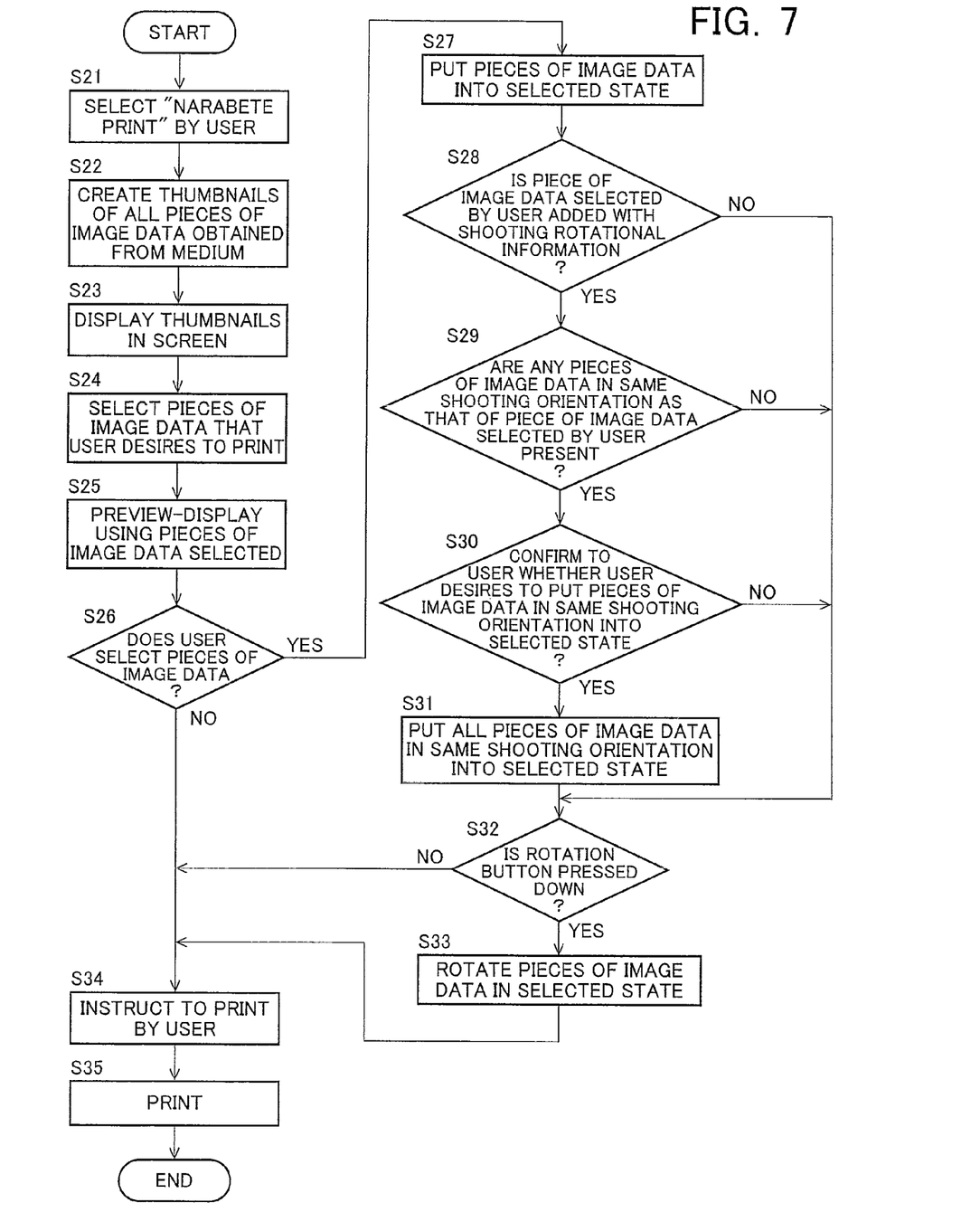
FIG. 7 is an explanatory flowchart of another exemplary process in the image processing apparatus according to the present invention.

FIG. 7 is an explanatory flowchart of another exemplary process in the image processing apparatus according to the present invention. Similarly to the above example, the image processing apparatus has a function of printing a plural piece of image data obtained from a storage medium, etc., arranging them on one printing paper sheet (recording medium), the "Narabete Print (Arranged Printing)" function.

In FIG. 7, when a user selects "Narabete Print" in the display screen on the displaying and operating portion 3 (step S21), the image processing apparatus creates thumbnails of all the images using the pieces of image data obtained from the storage medium (step S22). The image processing apparatus displays the thumbnails in the screen on the displaying and operating portion 3 (step S23). At this time, the user selects the pieces of image data that the user desires to print from the thumbnails displayed (step S24). The image processing apparatus executes preview display using the pieces of image data selected by the user (step S25). In this case, the preview display is executed according to the printing form of disposing the pieces of image data selected by the user from the thumbnails arranging them on one printing paper sheet. The preview display screen of the pieces of image data selected is a screen as depicted in the above-mentioned FIG. 3.

When the user accepts the preview-displayed pieces of image data as they are, the user issues a printing instruction by pressing down the print button 13 in the preview display screen. In this case, after the preview display is executed, no selection of any piece of image data from the preview screen is further executed (step S26-NO) and the printing instruction is issued by the user (step S34). The image processing apparatus prints the pieces of image data selected, according to this instruction (step S35) and the process comes to an end.

On the other hand, as depicted in FIG. 3, when the pieces of image data displayed as the thumbnails include those that are rotated clockwise and those that are rotated counterclockwise being mixed, some users desire to cause the directions of the rotations of printed images to be same. In this case, each of such users selects one piece of image data in the preview display screen (step S26-YES). The image processing apparatus puts the selected piece of image data into a selected state in the preview display screen (step S27). The selected state refers to the state of a piece of image data that is explicitly displayed being distinguished from the other pieces of image data as in the above example, and this explicit display is executed by, for example, reducing the brightness of the piece of image data.

The image processing apparatus determines whether any shooting rotational information is added to the piece of image data selected by the user (step S28). As above, the shooting rotational information is added to image data by an image sensing apparatus such as a digital camera when shooting is executed by the image sensing apparatus. When the shooting rotational information is added to the selected image, the image processing apparatus searches to check whether any pieces of image data in the same shooting orientation as that of the piece of image data selected by the user are present in the other pieces of image data displayed in the preview screen (step S29).

When pieces of image data in the same shooting orientation as that of the selected piece of image data are present, the image processing apparatus confirms to the user whether the user desires to put the pieces of image data in the same orientation into the selected state (step S30). When the user executes an operation to instruct to put the other pieces of image data in the same shooting orientation into the selected state (step S30-YES), the image processing apparatus puts all of the pieces of image data in the same shooting orientation as that of the pieces of image data selected by the user into the selected state (step S31).

Figure 8:
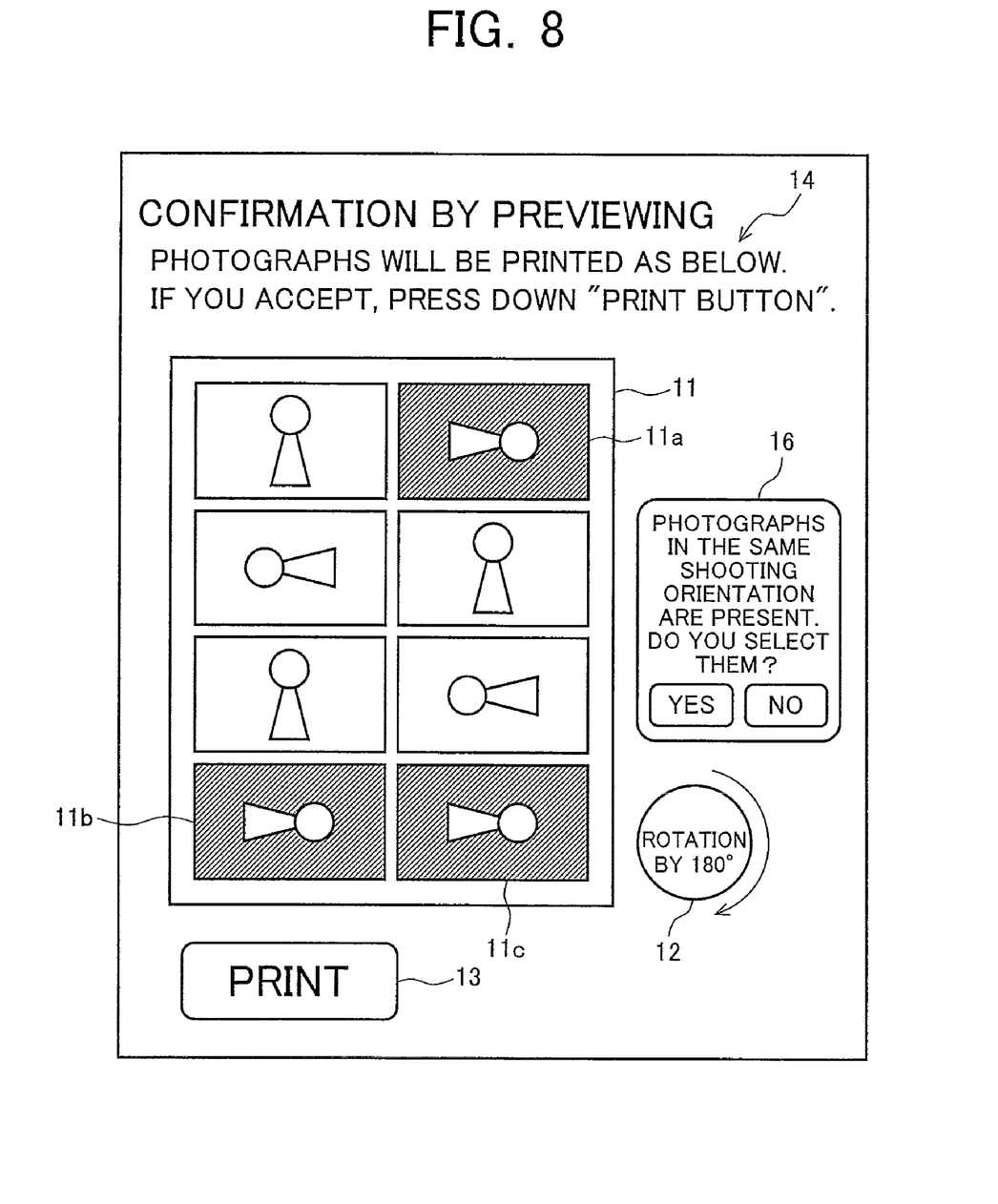
FIG. 8 is a diagram of an example of a preview display screen displayed when the images in the same shooting orientation as that of the image selected by the user are put into the selected state.

FIG. 8 is a diagram of an example of a preview display screen displayed when the pieces of image data in the same shooting orientation as that of the piece of image data selected by the user are put into the selected state. As depicted in FIG. 8, when the user executes an operation to put all of the pieces of image data in the same shooting orientation as that of the piece of image data selected into the selected state, the image processing apparatus explicitly displays that the pieces of image data 11b and 11c in the same shooting orientation as that of the piece of image data 11a selected are all in the selected state together with the piece of image data 11a by, for example, reducing their brightness. A dialogue 16 "Photographs in the same shooting orientation are present. Do you select them?" is displayed in this preview display screen, and the operation by the user to instruct to or not to put the pieces of image data into the selected state at step S30 may be executed using this dialogue 16.

In the above state, when the user presses down the rotation button 12 in the preview display screen (step S32-YES), the image processing apparatus rotates the pieces of image data that are in the selected state (step S33). By pressing down of the print button 13 by the user in this state, a printing instruction is issued to the image processing apparatus and printing according to the preview display screen is executed (step S35). When the user does not press down the rotation button 12 at step S32, the image processing apparatus does not rotate the pieces of image data that are in the selected state, and accepts the print instruction of the user.

In the case where no shooting rotational information is added to the piece of image data selected by the user at step S28, when no piece of image data in the same shooting orientation as that of the piece of image data selected by the user is present in the preview display screen at step S29 and when the other pieces of image data in the same shooting orientation are not put into the selected state at step S30, the image processing apparatus advances its process to step S32 and determines whether the rotation button is pressed down.

Figure 9:
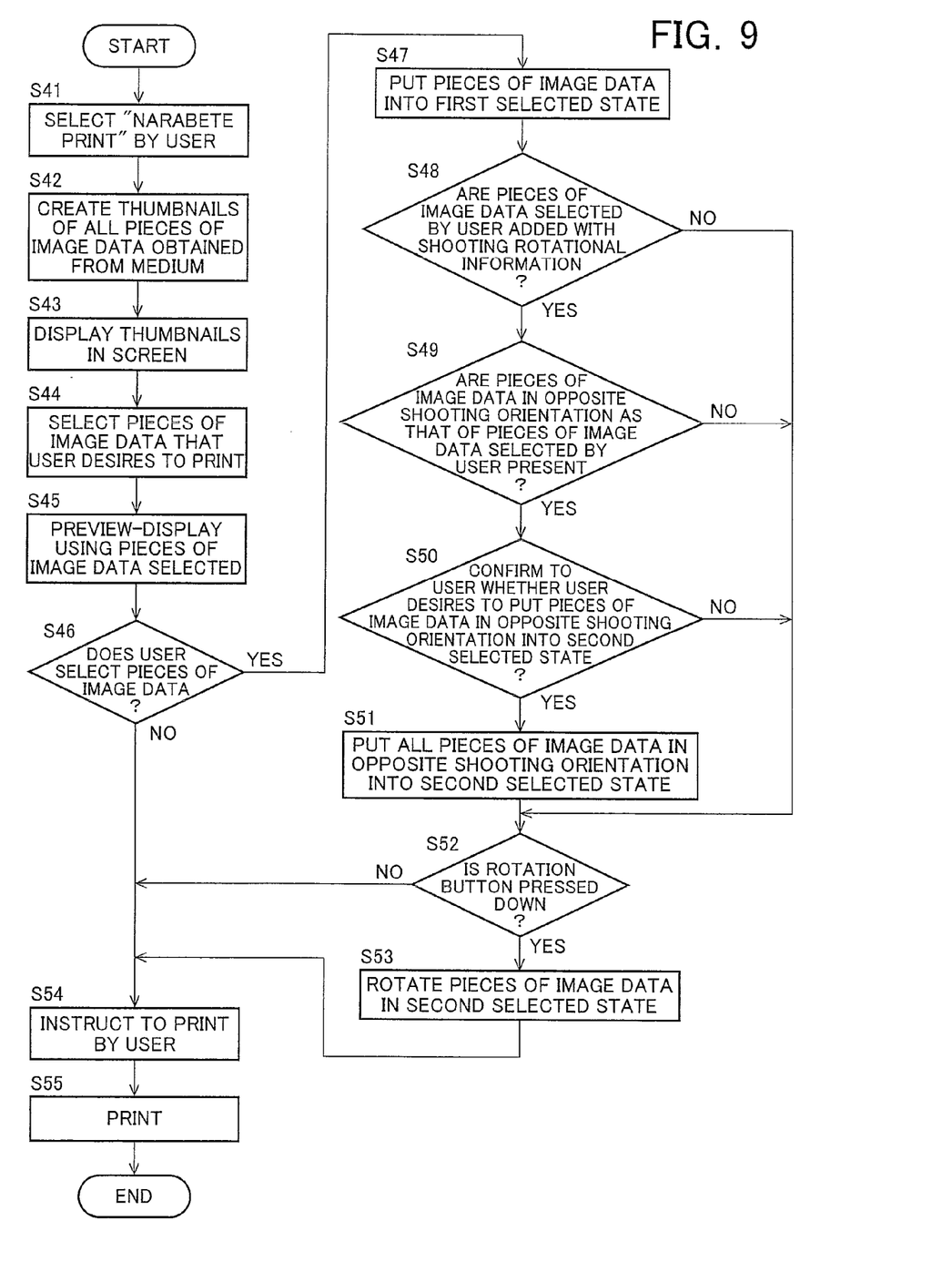
FIG. 9 is an explanatory flowchart of yet another exemplary process in the image processing apparatus according to the present invention.

FIG. 9 is an explanatory flowchart of yet another exemplary process in the image processing apparatus according to the present invention. Differing from the above example of FIG. 7, in this example, the image processing apparatus is adapted to, when the user selects the pieces of image data that the user desires to print from the thumbnails displayed, determine pieces of image data in the opposite shooting orientation to that of the piece of image data selected and rotate all the pieces of image data in the opposite shooting orientation such that the opposite orientation becomes same as the orientation of the piece of image data selected.

In the process of FIG. 9, steps S41 to S48 are same as steps S21 to S28 depicted in FIG. 7. That is, when the user selects "Narabete Print" in the display screen on the displaying and operating portion 3 (step S41), the image processing apparatus creates thumbnails of all the pieces of image data using the pieces of image data obtained from the storage medium (step S42). The image processing apparatus displays the thumbnails in the screen on the displaying and operating portion 3 (step S43). At this time, the user selects the pieces of image data that the user desires to print from the thumbnails displayed (step S44). The image processing apparatus executes preview display using the pieces of image data selected by the user (step S45). When the user accepts the preview-displayed pieces of image data as they are, the user operates the print button 13 in the preview display screen to issue a print instruction. In this case, after the preview display is executed, no selection of any piece of image data from the preview screen is further executed (step S46-NO) and the printing instruction is issued by the user (step S54). The image processing apparatus prints the pieces of image data selected, according to this instruction (step S55) and the process comes to an end.

On the other hand, as depicted in FIG. 3, in the case where the pieces of image data displayed as the thumbnails include those that are rotated clockwise and those that are rotated counterclockwise being mixed, when a user who desires to cause the directions of the rotations of printed images to be same selects one piece of image data in the preview display screen (step S46-YES), the image processing apparatus puts the images selected in the preview display screen in a first selected state (step S47). The first selected state refers to the state of a piece of image data that is explicitly displayed being distinguishable from the other pieces of image data using an approach of, for example, reducing the brightness of the image of the piece of image data. However, the piece of image data in the first selected state is displayed being further distinguishable from those in a second selected state described later.

The image processing apparatus determines whether any shooting rotational information is added to the piece of image data selected by the user (step S48). At this time, in the process of this example, when shooting rotational information is added to the piece of image data selected, the image processing apparatus searches to check whether any pieces of image data in the opposite shooting orientation to that of the piece of image data selected by the user are present in the other pieces of image data displayed in the preview screen (step S49).

When pieces of image data in the opposite shooting orientation to that of the piece of image data selected are present, the image processing apparatus confirms to the user whether the user desires to put the pieces of image data in the opposite shooting orientation into the second selected state (step S50). When the user executes an operation to instruct to put the other pieces of image data in the opposite shooting orientation into the second selected state (step S50-YES), the image processing apparatus puts all the pieces of image data in the opposite shooting orientation to that of the pieces of image data selected by the user into the second selected state (step S51).

At this time, when the user presses down the rotation button 12 in the preview display screen (step S52-YES), the image processing apparatus rotates the pieces of image data that are in the second selected state (step S53). By pressing down of the print button 13 by the user in this state, a print instruction is issued to the image processing apparatus and printing according to the preview-displayed images is executed (step S55). When the user does not press down the rotation button 12 at step S52, the image processing apparatus does not rotate the pieces of image data that are in the second selected state and accepts the print instruction of the user.

In the case where no shooting rotational information is added to the piece of image data selected by the user at step S49, when no piece of image data in the opposite shooting orientation to that of the piece of image data selected by the user is present in the preview-displayed images at step S49 and when the other pieces of image data in the opposite shooting orientation are not put into any selected state at step S50, the image processing apparatus advances the process to step S52 and determined whether the rotation button is pressed down.

When the image processing apparatus described in the above embodiments is caused to display the preview display having a plural piece of image data arranged therein in the display screen on the displaying and operating portion 3, the image processing apparatus may also be caused to: arrange each of all the pieces of image data to be printed the page on which all of the image are vertically long or horizontally long; and display the pieces of image data accordingly. That is, whether shooting is executed with a digital camera vertically long or horizontally long is known from the shooting rotational information added to the shooting data of the digital camera, etc. Usually, a piece of image data shot by a camera vertically long is vertically long and a piece of image data shot by a camera horizontally long is horizontally long. When pieces of image data that are preview-displayed are printed, the image processing apparatus is adapted to include only the pieces of vertically long image data or only the pieces of horizontally long image data in one page of a printing paper sheet to avoid mixture thereof.

In this case, when the image processing apparatus displays as thumbnails the pieces of image data obtained from a medium and preview-displays the thumbnails according to the selection by the user, the image processing apparatus creates pieces of vertically long image data in some pages and pieces of horizontally long image data in other pages as the pieces of image data for previewing. That is, the pieces of image data selected by the user are classified into the pieces of vertically long image data and the pieces of horizontally long image data, and the pieces of image data in the above two types of postures are preview-displayed such that the pieces of image data in each type of the postures are each printed in different pages. Thereby, when the pieces of image data preview-displayed are printed by the printer portion 2, all the pieces of image data in one page may be either the pieces of vertically long image data or the pieces of horizontally long image data, and may be printed for the user to easily view them.

According to the present invention, the following effect may be obtained.

According to the present invention, an image processing apparatus may be provided that has a function of arranging and printing a plural piece of image data obtained, wherein the image processing apparatus is adapted to be capable of printing the pieces of image data securely arranging them in the same orientation by an simple operation.

The invention claimed is:

1. An image processing apparatus comprising:
   an image data obtaining portion that obtains image data from an external storage medium;
   a printer portion that prints on a recording medium the image data obtained by the image data obtaining portion;
   displaying portion that preview-displays the image data to be printed by the printer portion before printing;
   a display control portion that causes the displaying portion to preview-display side-by-side a plurality of pieces of image data obtained by the image data obtaining portion;
   a shooting rotational information detecting portion that detects shooting rotational information added to the image data of which preview is displayed when the image data was shot; and
   an operation input portion that accepts operation input by a user, and
   configured to print the image data with the printer portion according to the preview-display, and wherein
   the display control portion selects a specific piece of image data in response to a reception of the operation input by the user through a screen of the displaying portion that preview and rotates at once all of pieces of image data having the shooting rotational information same as or opposite to the shooting rotational information added to the specific piece of image data according to a detection result by the shooting rotational information detecting portion.

2. The image processing apparatus as defined in claim 1, wherein,
   after the specific piece of the image data is selected and before an instruction for rotating image data is input to the operation input portion,
   the display control portion causes the displaying portion to change the preview-displays manner to preview-display the specific piece of image data and other pieces of the image data having the rotational information same as that added to the specific piece of image data so that they may be distinguished from the other image data and regarded as rotatable image data,
   and then if an instruction for rotating the rotatable image data is input to the operation input portion, the display control portion causes the displaying portion to rotate at once with the specific piece of the image data and all of the other pieces of image data having the rotational information same as that added to the specific piece of image data.

3. The image processing apparatus as defined in claim 1, where
   after the specific piece of the image data is selected,
   the display control portion, causes the displaying portion to change the preview-displays manner to preview-display the specific piece of the image data and other pieces of the image data having the rotational information same as that added to the specific piece of the image data so that they may be distinguished from the other image data and regarded as rotatable image data,
   and then if an instruction for rotating the rotatable image data is input to the operation input portion, the display control portion causes the displaying portion to rotate at once with the specific piece of the image data and all of the other pieces of the image data having the rotational information same as that added to the specific piece of the image data.

4. The image processing apparatus as defined in claim 1, where
   after the specific peice of the image data is selected,
   the display control portion, causes the displaying portion to change the preview-displays manner to preview-display the image data having the rotational information opposite to the specific piece of the image data so that they may be distinguished from the other image data and regarded as rotatable image data,
   and then if an instruction for rotating the rotatable image data is input to the operation input portion, the display control portion causes the displaying portion to rotate at once with the specific piece of the image data and all of the other pieces of the image data having the rotational information opposite to that added to the specific piece of the image data.

5. The image processing apparatus as defined in any one of claims 2 to 4, wherein
   the display control portion causes the displaying portion to display a dialogue to prompt the user to input the instruction for rotating the image data.

6. The image processing apparatus as defined in claim 1, wherein
   the display control portion creates reduced-size image data from the image data obtained by the image data obtaining portion, and causes the displaying portion to preview-display the reduced-size image data.

7. The image processing apparatus as defined in claim 1, wherein
   the display control portion causes the displaying portion to display the plurality of pieces of image data previewed side by side on the screen of the displaying portion so that all of the image data on a page are vertically long or horizontally long, and the printer portion prints the page on which all of the image data are vertically long or horizontally long.

* * * * *